Nov. 18, 1958  J. P. BUTTERFIELD ET AL  2,860,528
ELECTROMAGNETICALLY CONTROLLED TRANSMISSION
Filed June 29, 1953  6 Sheets-Sheet 1

INVENTORS
John P. Butterfield.
Franklin Walter.
BY John F. Jones.
Otto J. Winkelmann.
Harness and Harris
ATTORNEYS INVENTORS.
John P. Butterfield
Franklin Walter.
BY John F. Jones.
Otto J. Winkelmann.
Harness and Harness
ATTORNEYS.

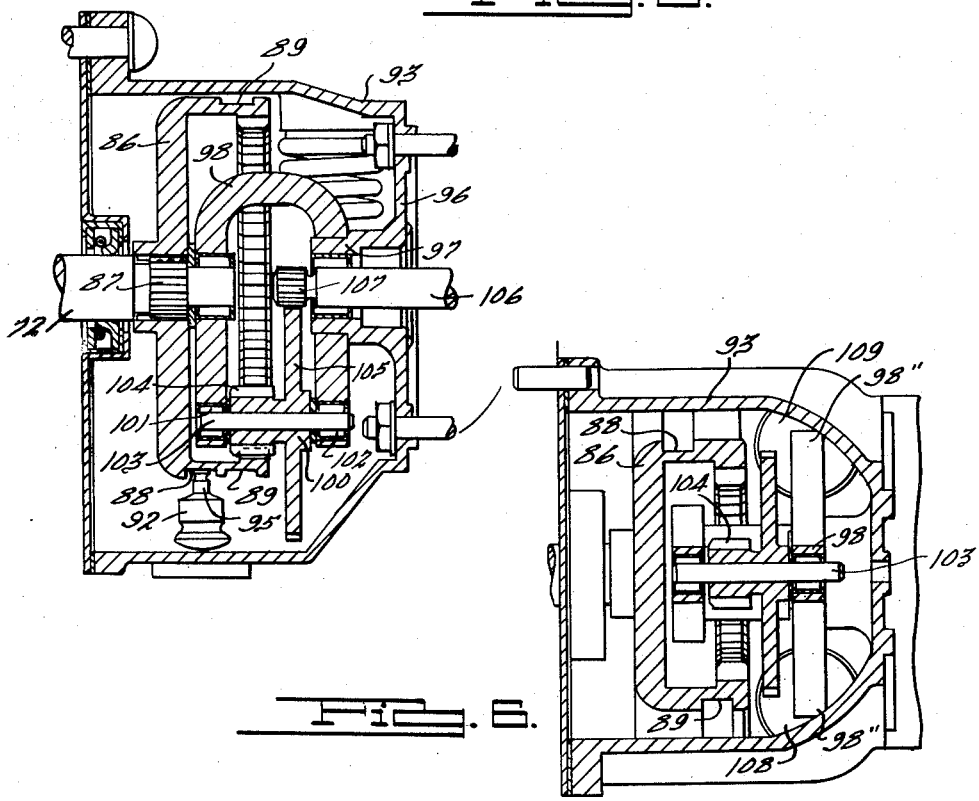
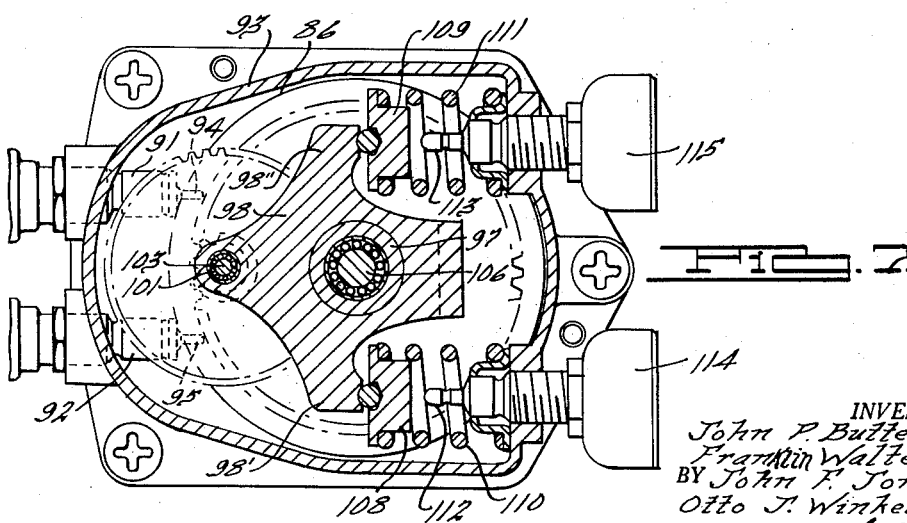

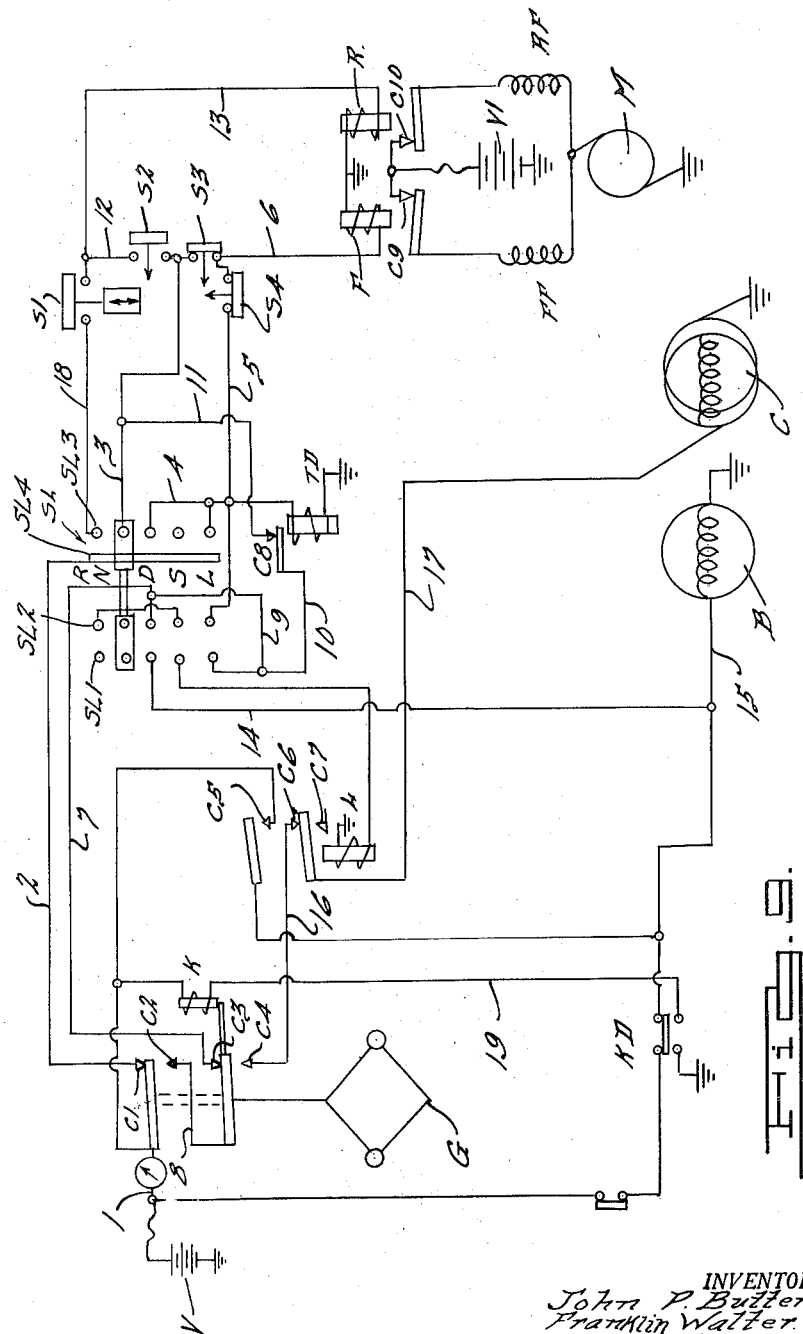

Nov. 18, 1958 J. P. BUTTERFIELD ET AL 2,860,528
ELECTROMAGNETICALLY CONTROLLED TRANSMISSION
Filed June 29, 1953 6 Sheets-Sheet 6

INVENTORS.
John P. Butterfield.
Franklin Walter.
BY John F. Jones.
Otto J. Winkelmann.
ATTORNEYS.

United States Patent Office 2,860,528
Patented Nov. 18, 1958

2,860,528

ELECTROMAGNETICALLY CONTROLLED TRANSMISSION

John P. Butterfield, Grosse Pointe, Franklin Walter, Harper Woods, and Otto Johann Winkelmann, Berkley, Mich., and John Franklin Jones, New Orleans, La., assignors to Chrysler Corporation, Highland Park, Mich., a corporation of Delaware Application June 29, 1953, Serial No. 364,774

17 Claims. (Cl. 74—753)

This invention relates generally to an automatically controlled transmission and more particularly to a planetary type transmission having electromagnetically controlled elements. The transmission of the present invention is most suitably adapted to be used on automotive vehicles.

One of the several objects of the invention is to provide a new and improved multiple speed transmission which includes a new and improved automatic shift control means for selectively obtaining a smooth shift from one gear ratio to another.

Another object of the invention is to obtain a multiple speed transmission having a planetary gear reduction unit with certain of the planetary components controlled by means of electromagnetic elements and other components controlled by means of friction elements.

Another object of this invention is to obtain a multispeed transmission having an electric automatic shift control means which is responsive to the road requirements to provide a proper sequence of operation for both the friction and electromagnetic planetary control elements.

Other objects of a more specific nature will be apparent from the accompanying drawings and the following description.

In general, the subject transmission comprises a double compound planetary gear unit having a sun gear input and a planet carrier output. The planetary unit is effective to provide three forward speeds and a reverse. Two cam actuated planetary brake bands are situated in close proximity to the planetary unit and are adapted to selectively engage and control the gear elements to obtain reverse operation and a high reduction "low" speed. In addition, an electromagnetic brake and an electromagnetic clutch are situated in an axially spaced relationship with respect to the planetary unit and they are adapted to selectively control the gear elements to obtain either of two additional forward speeds. The electromagnetic elements and the planetary gear elements are each separately enclosed in separate portions of the transmission.

The portion of the housing containing the gear elements includes an oil sump for lubricating oil. The portion of the housing containing the electromagnetic elements is separated from the gear elements and the oil sump by means of a wall which permits the electromagnetic elements to "run dry."

An anterior portion of the housing is adapted to contain a fluid coupling which comprises an engine-powered pump and a turbine secured to a planetary power input shaft.

The planetary "low" and reverse brake bands are energized by means of a camshaft which in turn is rotatably actuated by means of an electric motor. A pair of torque responsive limit switches and a pair of cam actuated limit switches responsive to the angular movement of the motor armature are provided to control the planetary brake elements in the proper sequence. A speed responsive governor is provided to actuate other control switches for energizing the electromagnetic elements in synchronism with the planetary brake bands.

For a more detailed description of the invention, reference will be made to the accompanying drawings in which.

Figure 8:
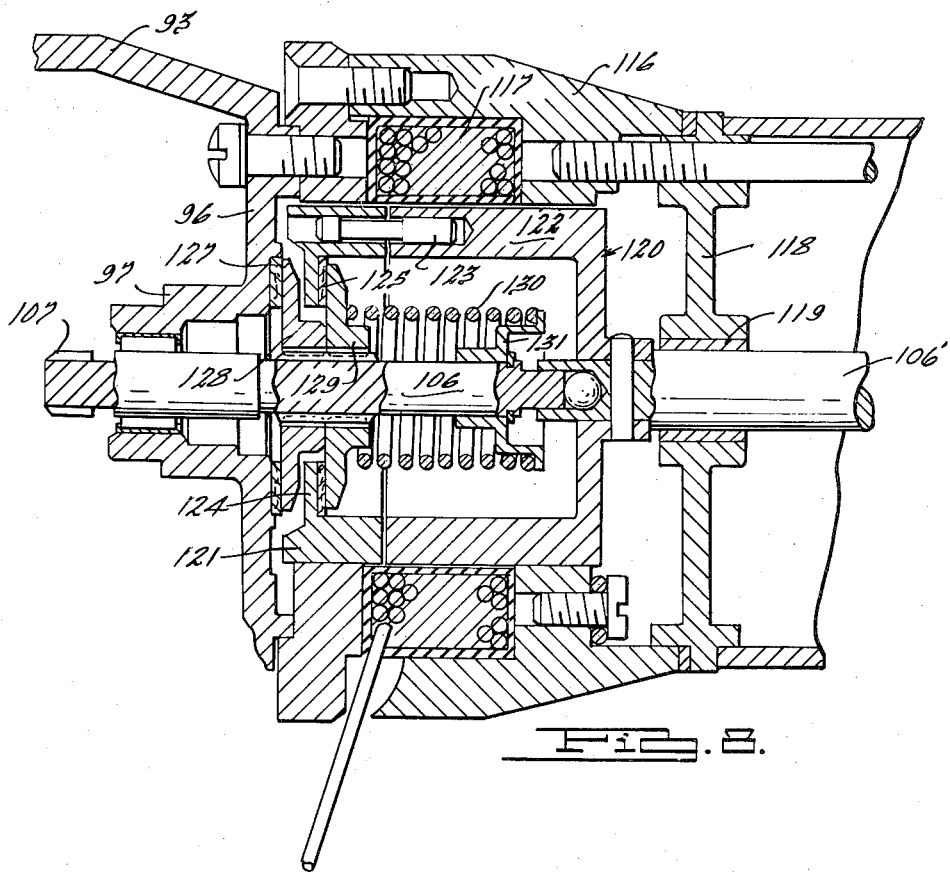
Figure 11:
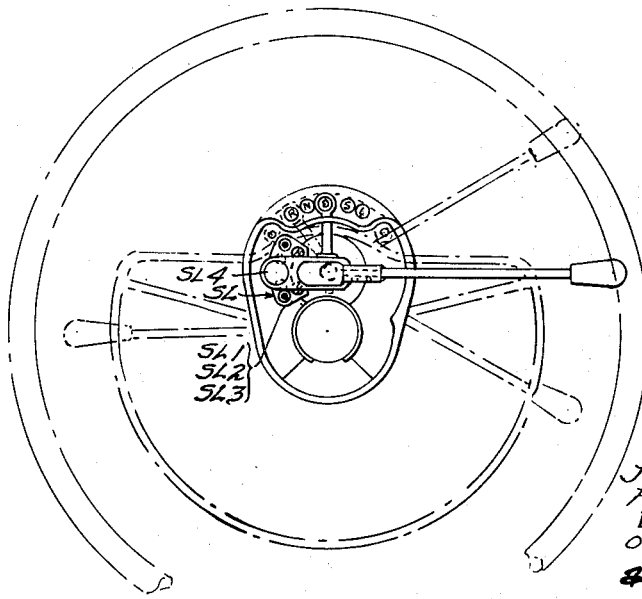

Figures 5, 6, and 7 show plan, side and end views respectively, of the motor actuator limit switch mechanism;

Figure 8 shows the brake band actuator motor;

Figure 9 shows the wiring diagram for the electrical control circuits;

Figure 10 is an outer view of the governor which actuates the switches for the electromagnetic elements; and Figure 11 is a view showing the transmission control selector switch in the steering wheel column.

Figure 1:
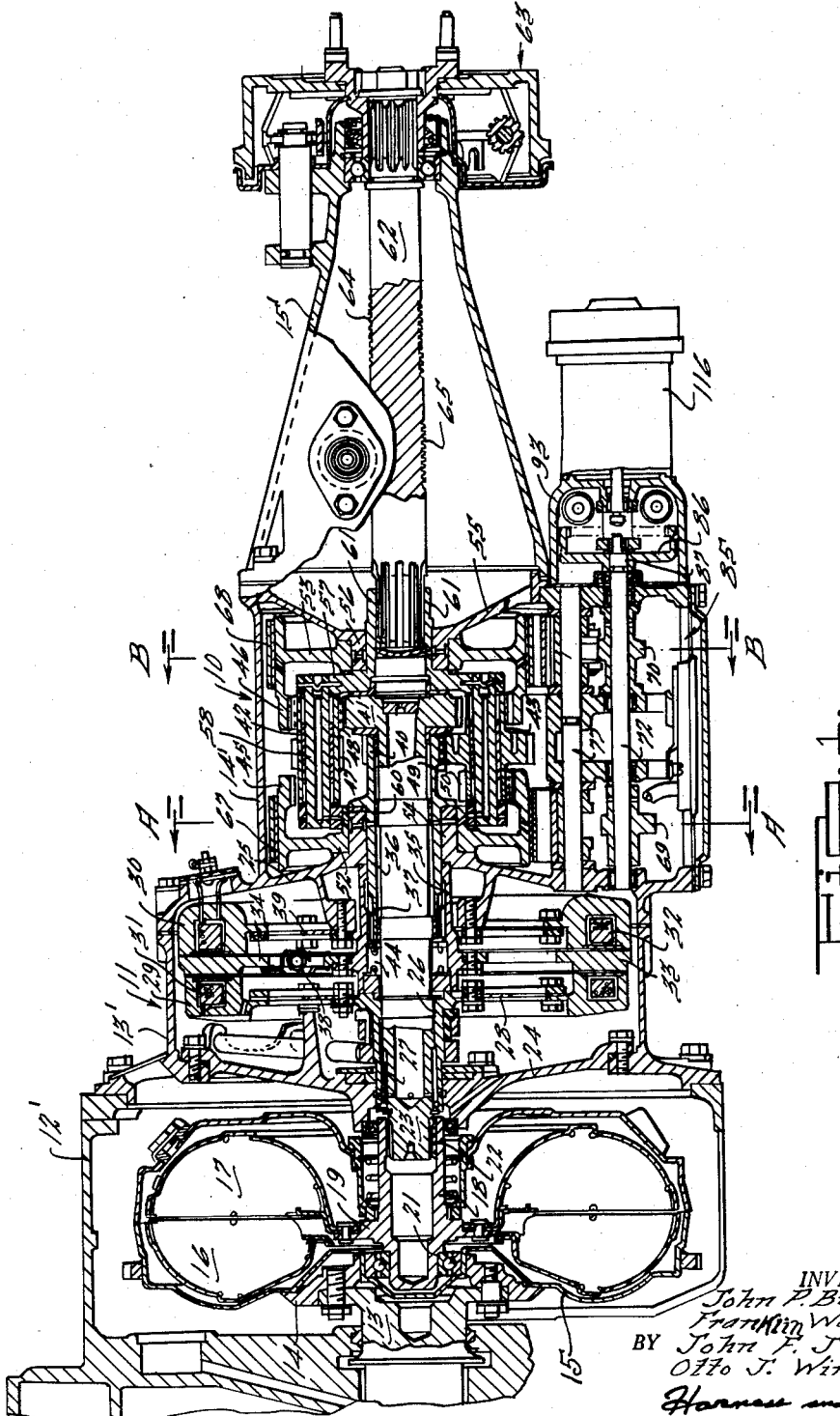
Figure 1 is a cross sectional view showing the transmission assembly.
Figure 2:
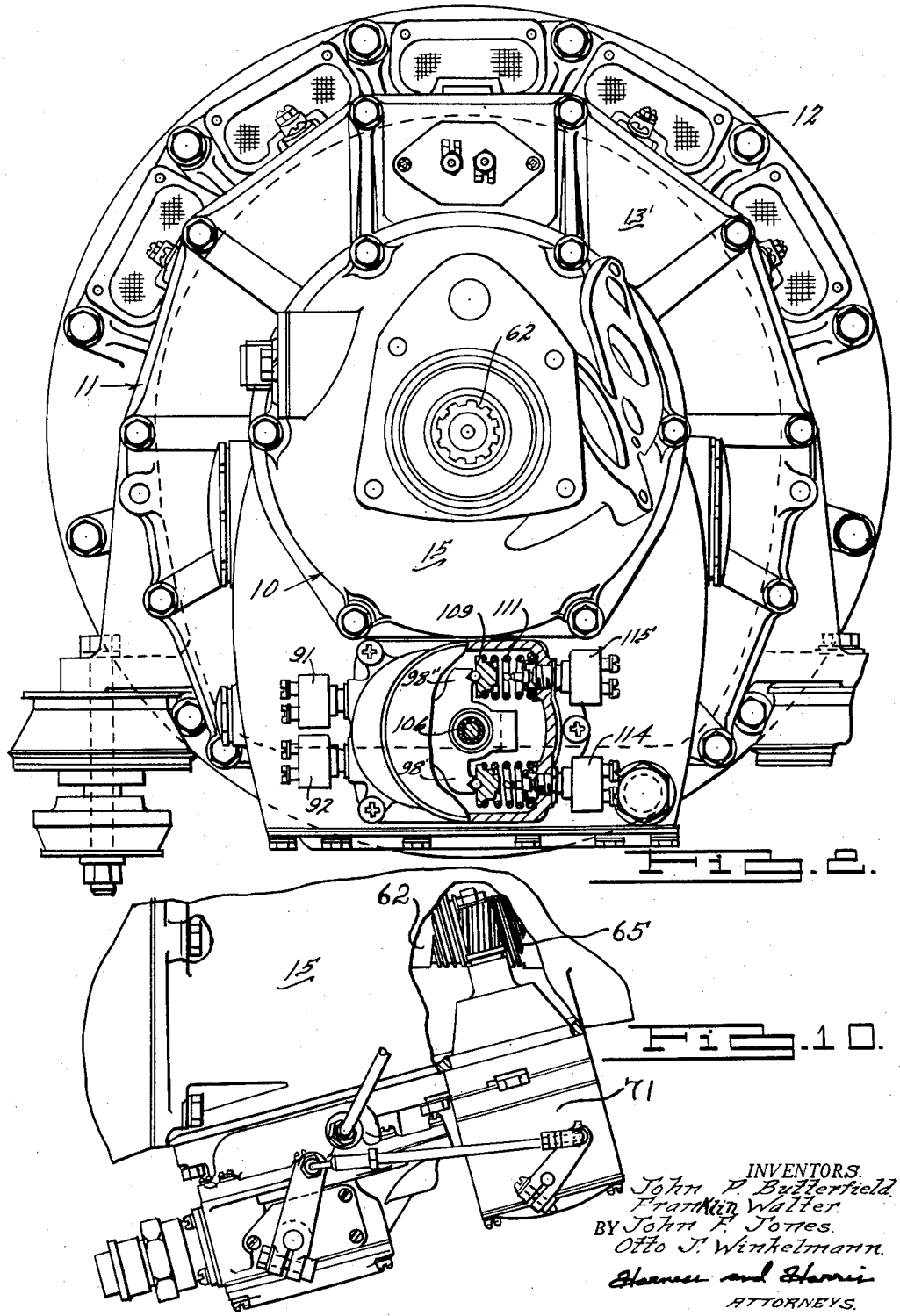
Figure 2 is an end view of the transmission showing the limit switches partly in section.

Having reference first to Figure 1, the transmission planetary elements are generally designated by numeral 10 and the electromagnetic elements are generally designated by numeral 11. The transmission housing comprises four principal portions, 12', 13', 14', and 15' which are adapted to contain the fluid coupling, the electromagnetic elements, the planetary elements, and the tailshaft respectively. The portion 12' is secured to the vehicle engine, not shown, and is adapted to receive therein the engine crankshaft flange 13 upon which an adaptor 14 is bolted. A shell 15 is drivably carried by the adaptor 14 and has received therein the coupling pump member 16. The turbine member 17 is rotatably mounted within housing 15 by means of shaft 18 which includes a radial flange portion 19 to which the hub portion of the turbine member is secured. The shaft 18 is rotatably mounted at one end by means of suitable bearings 21 and is splined at the other end at 22 to shaft 23. Shaft 23 extends axially through the housing portions 13' and 14' and has secured at the end thereof the sun gear 41 of the planetary unit.

The housing portion 13' is separated from the adjacent housing portions 12' and 14' by means of walls 24 and 25, respectively, which are centrally apertured to allow the shaft 23 to extend therethrough. A sleeve 26 surrounds shaft 23 and is plined thereto at 27. A radial support plate 28 is secured to a radial flange portion of sleeve 26 and carries at its periphery an electromagnetic clutch element 29. The centeral aperture in plate 24 serves to provide a bearing surface for rotatably journalling the sleeve 26.

The electromagnetic element 29 includes a core element 31 embedded therein and an annular friction element on one axial face thereof. The friction element may be axially spaced approximately .010 inch from an armature member 33 which is carried by a flexible radial support plate 34. Plate 34 is in turn secured to a radial flange on a sleeve 35 which is splined at 37 to hollow shaft 36 extending axially into housing portion 14'. A suitable vibration damping means, as at 38, may be provided within the armature support plate 34. The sleeve 35 is adapted to receive internally thereof a one-way clutch 44 which is effective to clutch the sleeve 35 to a suitable clutch race provided on the outer surface of shaft 23. The central aperture in plate 25 serves to provide a bearing surface to rotatably secure the shaft 36.

Located adjacent the face of the armature opposite to the clutch element 29 is an electromagnetic brake element 30 having a core element 32 and an annular friction element similar to that on the clutch element 29. The core element 32 includes suitable electrical leads extending from the rear of the brake element 30. A suitable radial support plate 39 is bolted to the housing wall 25 and is adapted to carry the brake element 30 at its periphery.

A sun gear 40 of the planetary unit is carried by the end of shaft 36 and is of a smaller pitch diameter than an adjacent sun gear 41 located at the end of shaft 23. A series of planetary gear elements 42 and 43 are alternately spaced about the shafts 23 and 36. Two rings gears 45 and 46 surround the planetary elements. Planetary elements 42 include two toothed portions 47 and 48 and planetary elements 43 include two toothed portions 49 and 50. The tooth portion 48 engages sun gear 41 and ring gear 46. The tooth portion 49 of planetary element 43 engages sun gear 40 and the tooth portion 50 of planetary element 43 engages ring gear 45. The tooth portion 47 of planetary element 42 also engages the toothed portion 49 of the planetary element 43.

The ring gears 45 and 46 are formed integral with the radial support or web members 52 and 53 respectively. Member 52 has a central aperture and receives therein an extension 54 of plate 25 which serves as a mounting upon which member 52 is free to rotate. A closure plate 55 for housing portion 14' has a hub portion 56 upon which the member 53 is rotatably mounted. The planetary elements 42 and 43 are secured to carrier member 57 by means of pins 58. The carrier member is in turn rotatably mounted at one end upon an extension 60 of member 52 and at the other end in the aperture in plate 55, a suitable extension 61 being provided for this purpose.

The extension 61 is internally splined to provide a driving connection with a tailshaft 62 which extends axially through housing portion 15'. A suitable power takeoff means is provided at the end of the housing portion 15' and tailshaft 62, and is designated generally by numeral 63. The tailshaft 62 is also provided with a speedometer driving worm gear at 64 and a governor driving worm gear at 65.

The ring gears 45 and 46 are adapted to be engaged by radially contractable brake bands 67 and 68.

Figure 3:
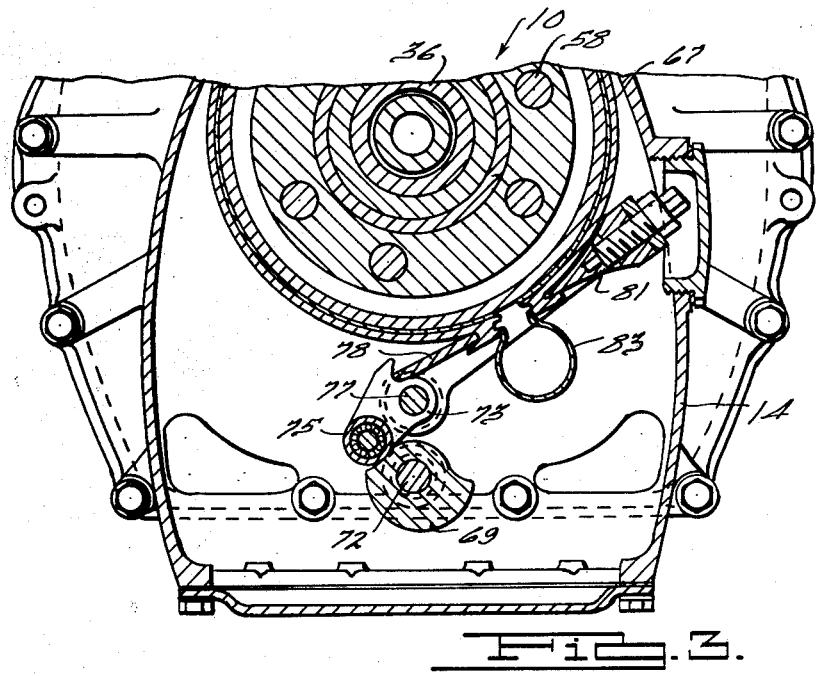
Figure 3 is a sectional view of the transmission taken along section line A—A of Figure 1 showing the reverse brake band mechanism.
Figure 4:
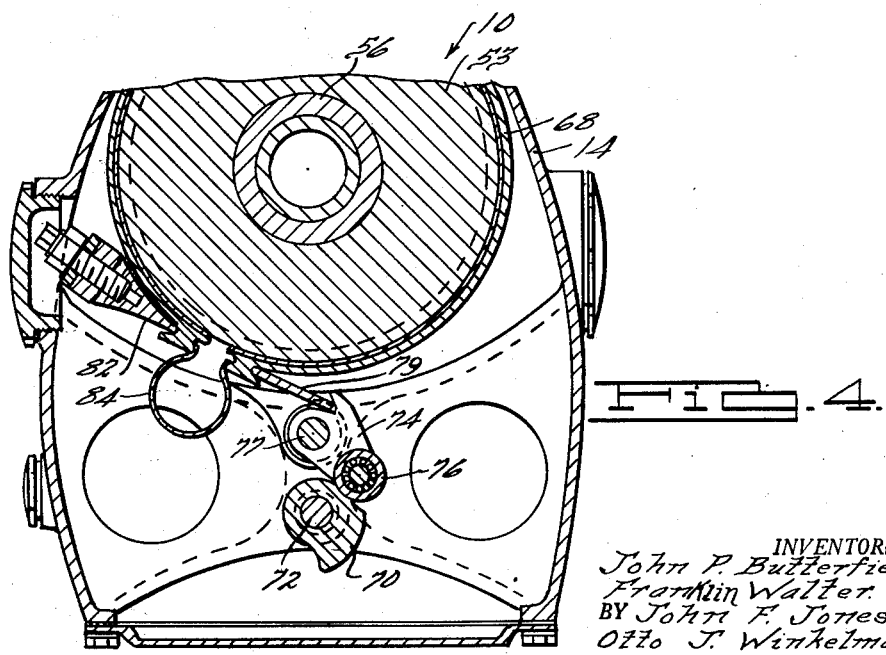
Figure 4 is a sectional view of the transmission taken along section line B—B of Figure 1 showing the low brake band mechanism.

Referring to Figures 3 and 4, it is seen that the bands 67 and 68 are actuated by means of cams 69 and 70 which are secured to camshaft 72 and which are angularly displaced with respect to each other. Rocker arms 73 and 74 carry cam followers 75 and 76 respectively and are pivotally mounted on shaft 77. The movement of the rocker arms 73 and 74 is transmitted to the bands by means of links 78 and 79 respectively, which are seated within suitable toothed portions of the associated rocker arms and brake band ends. Adjustable stop members 81 and 82 are adapted to engage the other ends of the brake bands 67 and 68, suitable tooth portions being provided on these and other band ends for this purpose. Suitable springs 83 and 84 are provided intermediate the ends of bands 67 and 68 respectively, to force the ends against their respective stop members.

The camshaft 72 is rotatably mounted in the housing portion 14' at either end thereof above an oil sump designated generally by the numeral 85. One end of the camshaft 72 is drivably secured at 87 to the ring gear member 86.

As seen more particularly in Figures 5, 6, and 7, the ring gear member 86 is provided with two cam grooves 88 and 89 on its periphery. Two limit switches 91 and 92 are mounted upon the outer housing 93 and they include cam follower elements 94 and 95, respectively. Elements 94 and 95 are each seated separate over the cam grooves 88 and 89 on the ring gear member 86. The housing 93 has an end plate 96 with a central hub portion 97.

Rotatably mounted upon the end of shaft 72 and the hub portion 97 is a yoke 98 which serves as a carrier member for planetary element 100 which is mounted thereon by means of bearings 101 and 102 and by shaft 103. The planetary element 100 comprises a small diameter gear 104 and a larger diameter gear 105. An actuator armature shaft 106 is rotatably mounted within a central bore within hub portion 97 and carries on its end a small sun gear which drivably engages the gear 105 of the planetary element. The gear 104 of the planetary element in turn engages the ring gear 86. The yoke 98 is formed with two transversely extending wings 98' and 98" which can best be seen in Figure 7. Compression spring caps 108 and 109 are adapted to be engaged by the wings 98' and 98" and depressed against the force of springs 110 and 111, respectively, which are seated on the housing 93. Located within springs 110 and 111 adjacent the associated spring caps are contact elements 112 and 113 of a second set of limit switches shown generally at 114 and 115 respectively.

The switches 114 and 115 are normally in the closed position but are opened when their associated contact elements are depressed. However, switches 91 and 92 are normally open and are closed when their associated cam follower elements are depressed as the ring gear rotates.

A motor housing 116 is bolted on the end of housing 93. A suitable electric motor may be enclosed within the housing 116 and the armature thereof may include an armature shaft extension 106' which may be journalled at 119 in a transverse closure wall 118 as shown. A cylindrical actuator armature member 120 may be secured to the end of shaft 106' so that they both turn as a unit, the wall 118 serving to separate the actuator armature 120 and the motor armature. The armature member 120 is centrally disposed within said winding 117 and is free to rotate when the motor field windings are excited, the coil 117 being electrically connected with the motor field windings.

The actuator armature member 120 comprises a short armature 121 and a long armature 122 which are both generally cylindrical in shape and which are joined in an end-to-end relationship by means of pins 123 driven into suitable bores in the long armature as shown. The short armature 121 is free to slide axially upon the pins 123 a predetermined amount. An inwardly extending radial flange 124 is formed on the short armature 121 and friction material 125 in the form of an annular disc is secured to the inner face thereof. A similar disc of friction material is secured to the surface of housing 93 as seen at 127. The armature shaft 106 has slidably splined thereon an annular brake member 128 and a similar annular clutch member 129 both of which have annular friction surfaces adapted to frictionally engage the discs 127 and 125 respectively. The clutch and brake members 129 and 128 are biased in an axial direction against the friction discs by means of spring 130 which is seated in a suitable spring seat 131 secured to the armature shaft 106.

To illustrate the operation of this invention, reference will be made to the wiring diagram of Figure 9. Several of the elements shown schematically in Figure 9 are shown more completely in other figures of the drawings. For example, the electromagnetic clutch and brake elements 29 and 30 shown in Figure 1 are illustrated in Figure 9 at C and B respectively. The manual selector switch on the steering wheel hub, as seen in Figure 11, is shown in Figure 9 at SL. The actuator motor which is shown in detail in Figure 8 is shown schematically in Figure 9 at M. The speed responsive governor 71 which is illustrated in Figure 10 and which is driven by the transmission tailshaft 62 by worm gear 65 shown in Figure 1, is represented schematically in Figure 9 at G. The limit switches 91, 92, 114, and 115, as seen in Figure 7, are represented schematically in Figure 9 at S2, S3, S1 and S4 respectively.

The selector switch SL, as seen in Figure 9, includes three rows of contacts SL1, SL2, and SL3 and a movable selector element SL4 is interposed between the rows SL2 and SL3. When the selector switch is moved vertically, as viewed in Figure 9, to a certain position, a pair of horizontally adjacent contacts in the rows SL1 and SL2 are electrically interconnected and the corresponding contact in row SL3 is connected to the movable element SL4. The selector switch SL is, therefore, double acting. In the complete view of Figure 11, the selector switch SL is shown in a mounted position at the top of the vehicle steering post. The selector bar SL4 forms a portion of the usual type of gearshift lever found in conventional automotive vehicles and it may be manually actuated to selectively contact the individual contact elements of the three rows of contacts SL1, SL2, and SL3. A suitable position indicator arm may be secured to the shift lever as shown and the various angular portions thereof may be designated by the symbols "R," "N," "D," "S" and "L," as shown, each position corresponding to a separate drive range referred to as "reverse," "neutral," "drive," "second" and "low," respectively.

*Neutral.*—The manual selector switch is moved to the neutral position shown at N in Figures 9 and 11. All of the contacts shown at C1 through C10 are in the position illustrated, in Figure 9. The cam actuated switches S2 and S3 are both open and the spring loaded switches S1 and S4 are both closed. Thus it is seen that the ignition current from the battery, which is illustrated at V, energizes line 1, the contact C1, line 2, the movable element SL4 in selector switch SL and finally line 3. Since the switches S2 and S3 are both open, the circuit is broken at this point and none of the various relays are actuated. Accordingly, brake bands 67 and 68 and the electromagnetic elements 29 and 30 are not energized and the ring gear and planet elements in the planetary merely float without causing torque to be delivered to the carrier.

*Low gear.*—The manual selector switch SL is moved to the drive position D. At the instant the selector switch is moved, the limit switches are in the same position as they were for neutral operation. That is, S1 and S4 are closed and S2 and S3 are open. The ignition current from the battery V now flows through line 1, contact C1, line 2, the selector switch, line 4, limit switch S4, line 6 and then through the forward motor relay F. When relay F is energized, the contact C9 closes thus permitting the forward field FF to become energized by a battery voltage source V1. The current in line 4, in addition to passing to line 5, is effective to energize the time delay relay TD which causes the contact C8 to open.

When the forward field FF is energized, the armature 120 begins to rotate within the motor housing 116. At the same instant, the short armature 121 slides axially on pins 123 due to the solenoid effect of the energized field. This axial movement takes place against the pressure of the compression spring 130 thereby causing the friction element 125 to drivably engage the clutch member 129 thus clutching the armature to the armature shaft 106. The torque being delivered to shaft 106 is effective to cause sun gear 107 to drive the planet element 100 which in turn drives the ring gear which is splined to camshaft 72. The cam 70 is effective when rotated to actuate the rocker arm 74 shown in Figure 4 which in turn tightens the brake band 68. As soon as the band 68 tightens, the reaction torque causes the yoke 98 to shift about its axis and compress spring 111 and open the limit switch 115. (Refer to Figure 7.) Also, since the ring gear is rotated, the cam follower element 94 is depressed as it rides in the cam groove 88 thereby causing the limit switch S2 to close. The limit switch S3, which was open before a shift to low gear was initiated, remains open since the cam groove 89 in which the cam follower element 95 rides slopes in the opposite direction from cam groove 88. Also, the spring loaded limit switch S1, which was closed before the shift to low gear was initiated, remains closed since the wing 98' moves away from contact element 112. Therefore, it is seen from Figure 11 that the ignition current flowing from battery V through lines 2, 4, and 5 is interrupted at S4 thereby deenergizing relay F and opening the forward field circuit in the actuator motor. Now, referring again to Figure 8, it is seen that as soon as the motor field circuit is opened, the coil winding 117 is deenergized and the solenoid action holding the short armature against the pressure of spring 130 is relieved, thereby releasing the clutching engagement of the short armature with the shaft 106. Simultaneously with this releasing of the clutching engagement, the spring 130 shifts the elements 128 and 129 axially, thereby immediately braking the shaft 106 to the housing 93 by means of the braking element 128 and the friction disc 127. The low gear brake band 68 is, therefore, held in the engaged position. Accordingly, the engine power is delivered from pump 16 to turbine 17, then through shaft 23 to sun gear 41. Since the ring gear 46 is held by band 68, the planet carrier 57 is effective to deliver power to the output tailshaft.

*Second gear.*—The manual selector switch SL is kept in the same position as before, namely, position D. As the vehicle gains speed in first gear, the governor G is effective to cause contact C1 to open and contact C2 to close. When the contact C1 is opened, the current flowing through line 2, switch SL, line 4 and the time delay relay TD is interrupted thus causing the contact C8 to close. The time delay relay TD is effective to maintain contact C8 open for approximately 0.30 seconds after the contact C2 closes. Therefore, it is seen that the second speed brake B and the low speed brake band 68 are energized at the same time for a very short interval. This overlapping in operation will prevent the engine from "running away" when the transmission is shifting from low gear to second gear thereby increasing the smoothness of operation. After the relay TD permits the contact C8 to close, the ignition current will flow through line 1, contact C2, line 8, contact C3, line 7, switch SL, line 9, line 10, contact C8, line 11, line 3 to limit switch S2, line 12, and line 13 to the reverse relay R. When relay R is energized, contact C10 closes thereby exciting the reverse field in the actuator motor and thus causing the camshaft 72 to rotate in the reverse direction. This reverse rotation is brought about when the short armature 121 is moved axially against spring pressure due to the solenoid effect of the motor field. This axial movement releases the brake member 128 and causes the shaft 106 to become clutched to the armature 120 through the clutch member 129 and friction element 125. This backward rotation is effective to release the low gear brake band. As soon as the camshaft reaches the intermediate position, the limit switch S2 is opened due to the rotation of cam groove 88 thereby opening the motor reverse field. The switch S4, which is opened at the instant the second gear brake is engaged, closes as soon as the low gear brake band is released since the spring 110 is now no longer compressed. It should be noted that the position of the four limit switches at the instant that the contact C2 closes is the same as that which exists while the low speed band is energized. That is, S1 and S2 are closed and S3 and S4 are open. After the low speed band has been released, the position of the switches are as follows: S1 still remains closed, S2 is open, S3 still remains open and S4 is closed. It is seen that after the contact C2 closes, the ignition current energizes the second gear electromagnetic brake B by virtue of the completed circuit through line 1, contact C2, line 8, contact C3, line 7, switch SL, line 14 and line 15.

Accordingly, the armature 33 becomes braked to the transmission housing which causes shaft 36 and sun gear 40 to be held stationary. The power being delivered from the turbine driven shaft 23 and sun gear 41 drives toothed portion 48 of the planet element 43 which also causes toothed portion 47 to drive toothed portion 49 which in turn rides around the fixed sun gear 40, thus turning the planet carrier.

*Third gear.*—The selector switch SL is kept in the same position as before, namely, position D. Upon a further increase in vehicle speed, the governor G also closes contact C4 and open contact C3. Contact C2 remains closed. Thus it is seen that the ignition current is now allowed to flow through line 1, contact C2, line 8, contact C4, line 16, contact C6 and line 17 to the third speed electromagnetic clutch C. Since contact C3 is now open, the brake B is immediately deenergized. The limit switches S1, S2, S3, and S4 were not affected by this shift and they keep the same positions they were in during second speed operation. That is, S1 is closed, S2 is open, S3 is open and S4 is closed.

Accordingly, the armature 33 is clutched to the element 29 thereby causing shafts 36, 23 and sun gears 40 and 41 to turn as a unit. Since the planetary elements are locked together, the carrier is driven with a direct drive ratio.

*Reverse.*—In order to shift to reverse, it is necessary to go through the neutral position. Accordingly, at the initiation of the reverse shift the switch S1 is closed, S2 is open, S3 is open and S4 is closed. As soon as the selector switch SL is moved to the reverse position R, the ignition current passes through line 1, contact C1, line 2, switch SL, line 18, switch S1, line 13 to the reverse relay R which causes the reverse field to become excited. This causes the short armature 21 to become clutched o shaft 106 as before which enables cam 69 to be rotated. Cam 69 actuates rocker 73, as seen in Figure 3, thereby tightening band 67. As soon as band 67 is tightened, the wing 98' compresses spring 110 thereby causing limit switch 114 to open. (See Figure 7.) This switch 114 is shown in Figure 9 at S1. The reverse field is deenergized as soon as S1 opens and immediately the short armature releases the clutching engagement with member 129. At this same instant, the shaft 106 is braked to the housing 93 through member 128 and element 127. The power being delivered to shaft 23 and sun gear 41 drives planet element 42 which in turn drives element 43 which has a toothed portion 50 engaged with the fixed ring gear 45. Thus the carrier is rotated in a direction which is opposite to the direction of rotation of the shaft 23.

The kickdown switch KD is effective to cause the transmission to shift from third speed direct drive to second speed by energizing relay K which in turn is effective to open contact C4 and close contact C3.

To prevent the transmission from shifting into third gear, the selector switch SL is placed in the S position. This causes battery current to energize relay L which in turn opens contact C6 and closes contact C5.

To prevent the transmission from shifting from low range, the selector switch may be moved to the "L" position. This causes the battery current to energize the relay TD which in turn opens contact C8. The path followed by the ignition current thus comprises the line 1, contact C1, line 2, switch SL, line 5, switch S4 and line 6. The forward relay F therefore becomes energized and the low speed brake band is applied. If the vehicle speed increases until the contact C1 opens and the contact C2 closes, the ignition current will still continue to energize the forward relay and the low speed brake band will still be applied. In this latter instance, the ignition current will pass through line 1, contact C2, line 8, contact C3, line 7, line 9, switch SL, line 5, switch SL1 and then into the forward relay F.

If a "push start" is desired, the one-way clutch 44 is effective to cause the shaft 23 and sleeve 35 to become locked together thereby providing a path for the transfer of torque from the tailshaft to the coupling members 16 and 17. Under normal operation the shaft 23 rotates either faster or at the same speed as the sleeve 35 which causes the clutch 44 to "over run." However, when torque is being delivered from the tailshaft to the coupling, the carrier and planet elements tend to drive the gear 40 faster than the gear 41. This causes the clutch 44 to drivably connect the shaft 23 and sleeve 35.

Several of the transmission design features all contribute to the exceptionally smooth operating qualities of the transmission as a whole during a change in reduction speeds. The positive and soft operating characteristics of the electromagnetic elements combine with the cushioning qualities of the fluid coupling to absorb any undesirable torsional disturbances. Also, the transmission planetary unit is designated to provide an even "step" between the various speeds which results in a more uniform rate of acceleration of the vehicle. For example, the transmission ratios for the disclosed embodiment in direct drive, second speed, low speed and reverse gear are 1.00, 1.61, 2.65 and 2.62 respectively.

It is thus seen that the subject transmission incorporates a novel arrangement of planetary clutch and brake elements together with a novel electrical automatic control means. Since the reverse and low brake bands are applied only when the vehicle is stationary, it is felt that the greatest need for smoothness in operation occurs while the transmission is shifting from second to third speed or from third to second speed. Accordingly, electromagnetic elements are used to control only these two shifts.

It should also be noted that the electromagnetic elements are located in a forward portion of the transmission housing which is separate from the portion containing the planetary unit and oil sump. Accordingly, the electromagnetic elements are allowed to run "dry" which results in higher torque capacity for second speed and direct drive.

While one embodiment of the invention has been disclosed, modifications thereof may be apparent to persons skilled in the art and may readily be made without departing from the scope of the present invention.

What we claim is:

1. In a control means, a camshaft, a motor actuator mechanism, a speed reduction means drivably connecting a portion of said mechanism and said camshaft, said mechanism including an armature shaft secured at one end to said reduction means, a first armature member concentrically mounted about said armature shaft, a second armature member slidably carried by said first armature member, one clutch means integrally mounted on said second armature member, another clutch means and a brake means slidably secured to said armature shaft, a spring means for biasing said other clutch means and said brake means in one axial direction to energize the same, said one clutch means and said other clutch means being effective to drivably connect said second armature member to said armature shaft upon movement of said second armature member in one axial direction, and said brake means being effective to brake said armature shaft upon movement of said second armature member in the other axial direction.

2. In a control means, a cam shaft, a motor actuator mechanism, a speed reduction means drivably connecting a portion of said mechanism and said cam shaft, said mechanism including a housing, an armature shaft extending axially through said housing and secured at one end to said reduction means, a first armature member concentrically mounted about said armature shaft, a magnetic coil secured within said housing and surrounding said first armature member in close proximity thereto, a second armature member slidably carried by said first armature member, one clutch means integrally mounted on said second armature member, another clutch means and a brake means slidably secured to said armature shaft, a spring means for biasing said other clutch means and said brake means in an axial direction to energize the same, said second armature member being adapted to shift axially toward said first armature member when said magnetic coil is energized, thereby drivably clutching said armature shaft to said second armature through said one clutch means and said other clutch means, said brake means being adapted to shift axially away from said first armature member when said magnetic coil is de-energized, thereby braking said armature shaft to said housing and holding the same in a fixed angular position.

3. In a control means, a cam shaft, a housing, an armature shaft mounted within said housing and drivably connected to said cam shaft, a first armature member, an electric coil mounted within said housing about the periphery of said first armature member in close proximity thereto, axially extending pins secured to the periphery of said first armature member, a second armature member having axially extending bores on the periphery thereof adapted to loosely receive said pins, a first clutch element integrally formed on said second armature member, a second clutch element slidably secured to said armature shaft and adapted to drivably engage said first clutch element upon axial movement of said second armature member on said pins in one axial direction in response to the solenoid action of said electric coil upon being energized, a brake element slidably secured to said armature shaft and adapted to be braked to said housing upon axial movement of said second armature member in the other axial direction, and spring means for biasing said second clutch element and said brake element in said other axial direction.

4. In an actuating device, a housing, an armature mounted within said housing, a camshaft operatively engaging said brake means, a planetary ring gear secured to one end of said camshaft, a planetary sun gear secured to one end of said armature shaft, a planetary carrier member, a pinion gear interengaging said sun gear and said ring gear mounted upon said carrier, a first armature member rotatably mounted about said armature shaft, a second armature member slidably carried by said first armature member, an electric coil mounted within said housing about said first armature member, an electric motor drivably connected to said first armature member, said motor having an electric field connected to said coil, said second armature being axially slidable in response to the solenoid action of said electric coil when said motor field is energized, clutch means for interconnecting said second armature means with said armature shaft upon movement of said second armature member in one axial direction, means for braking said armature shaft to the housing upon movement of said second armature member in the other axial direction, and limit switch means for opening said motor field circuit in response to a predetermined increase in armature shaft torque.

5. The device as set forth in claim 4 wherein said planetary carrier member includes two wing portions extending transversely with respect to said armature shaft, and said limit switch means includes a motor field circuit interrupter mounted in said housing and adapted to be actuated by said wings upon angular displacement thereof.

6. In a multispeed automatic transmission for delivering power from an engine source to a rotating tailshaft and having a planetary gear unit comprising a plurality of gear elements, an electromagnetic clutch means and an electromagnetic brake means for selectively controlling certain of said elements to obtain either of two forward speed planetary reduction ratios, and brake band means for controlling other of said elements to selectively obtain a reverse speed planetary reduction ratio and an additional forward speed planetary reduction ratio, the combination of an axially extending camshaft, cam elements carried by said camshaft and operatively engaged with said brake band means, an axially extending electric motor actuator, a motor armature shaft extending from said motor actuator, an auxiliary armature shaft, a planetary sun gear carried by said auxiliary armature shaft, a planetary ring gear carried by said camshaft in concentric relationship with respect to said sun gear, planet gear elements inter-engaging said sun and ring gear, carrier means for carrying said planet gear elements, a pair of cam surfaces carried by said ring gear about the periphery thereof, a first pair of limit switches slidably contacting said grooves and actuated thereby, said carrier means including transversely extending wings, another pair of limit switches mounted in the plane of said wings and adapted to be actuated by said wings upon angular displacement of said carrier, and control means for selectively energizing said electromagnetic clutch and brake, and said brake band means, said first and other pairs of limit switches forming a portion of said control means.

7. In a multi-speed automatic transmission having a planetary reduction unit, first brake means for selectively braking portions of said reduction unit, a camshaft, and cam elements carried by said camshaft operatively engaged with said brake means, said cam elements being operative to actuate said first brake means; the combination of an electric motor actuator, an electric circuit means for energizing said actuator, a gear means for drivably connecting said electric motor actuator and said camshaft, said electric motor actuator comprising a first armature member, a second armature member slidably carried by said first armature member, an electric coil surrounding said first armature member and forming a portion of said circuit means, an armature shaft mounted within said armature members concentrically thereof and secured at one end to said gear means, said second armature being adapted to move axially in response to the solenoid action of said electric coil, clutch means for drivably connecting said armature members and said armature shaft upon movement of said second armature member in an axial direction, second brake means for holding said armature shaft stationary upon movement of said second armature member in the other axial direction, motor actuator torque responsive limit switch means for interrupting said motor circuit means at a predetermined braking torque operated by said first brake means, and other limit switch means responsive to angular displacement of said armature shaft for controlling said motor circuit means in operative sequence with the first-named limit switch means.

8. The combination as set forth in claim 7 wherein said gear means comprises a ring gear connected to said camshaft, a sun gear connected to said armature shaft, a planet gear interengaged with said sun and ring gears and a carrier member for mounting said planet gear with wings extending transversely therefrom, said motor actuator torque responsive limit switch means comprising a pair of movable contact elements mounted in the plane of said carrier wings, and spring means for biasing said wings in opposition to a motor actuator torque reaction on said carrier member, said contact elements being adapted to be actuated by said wings upon deflection of said spring means.

9. The combination as set forth in claim 7 wherein said gear means comprises a ring gear connected to said camshaft, a sun gear connected to said armature shaft, a planet gear connected to said armature shaft, and a planet gear inter-engaged with said sun and ring gears, said other limit switch means comprising cam grooves carried by said ring gear about the periphery thereof, and contact elements mounted in the plane of said grooves and adapted to be slidably contacted thereby, said other limit switch means being actuated upon rotation of said cam grooves a predetermined amount in either direction.

10. In a control means for controlling the planetary reduction unit of a multi-speed automatic transmission to selectively obtain a plurality of reduction ratios, the combination of a camshaft, an electric motor actuator means having an armature shaft, electric coil windings disposed about said armature shaft, planetary gear means drivably connecting said camshaft and said armature shaft including a ring gear carried by said camshaft, a sun gear carried by said armature shaft, planet gear means interconnecting said sun and planet gears, a carrier member rotatably mounted about said armature shaft said camshaft, said carrier member and carrying said planet gear means, said ring gear having cam grooves about the periphery thereof, a first pair of limit switch means slidably contacting said cam grooves, said carrier member having portions extending transversely of said armature shaft, a second pair of limit switches mounted in the plane of said transversely extending portions, spring means for biasing said carrier member toward one position, said motor actuator means including an electric motor armature and forward and reverse motor fields disposed in the proximate vicinity of said motor armature, means for clutching said motor armature to said armature shaft, said coil windings being electrically connected to said motor fields, said first pair of limit switches being actuated upon rotation of said ring gear in either direction and said second pair of limit switches being actuated upon rotation of said carrier member against said spring means in response to motor armature torque, and an electric circuit means for selectively energizing said forward and reverse motor fields in sequence during a predetermined rotary movement of said ring gear while said armature shaft driving torque is below a predetermined value, said circuit switches forming a portion of said circuit means.

11. The combination as set forth in claim 10 wherein said means for controlling said planetary reduction unit further includes a brake means slidably carried by said armature shaft in proximity to said electric coil windings, said brake means being effective to retain said cam and armature shafts in a fixed position when said electric coil of motor fields are deenergized.

12. The combination as set forth in claim 10 wherein said clutching means includes an armature member mounted about said armature shaft, and a clutch element slidably carried by said shaft said clutch element being moved into driving engagement with said armature member when said electric coil windings are energized.

13. In a multiple speed transmission comprising a power input driving member, a power output driven member, a compound planetary gear unit interposed between said driving and driven members, said driving and driven members being drivably connected to separate portions of said gear unit, friction brake means for selectively braking either of two portions of said gear unit, and electromagnetic means for controlling other portions of said gear unit, the combination of a camshaft, cam elements carried by said camshaft adjacent said friction brake means for energizing the latter upon rotation of said camshaft, one portion of said gear unit being braked upon rotation of said camshaft in one direction and another portion of said gear unit being braked upon rotation of said camshaft in the opposite direction, a ring gear secured to said camshaft, an actuator armature shaft, a sun gear secured to said actuator armature shaft, planet gears drivably connecting said cam and ring gears, a carrier member rotatably supporting said planet gears, an electric motor including a motor armature and forward and reverse motor field windings, an actuator armature member drivably secured to said motor armature, actuator clutch means for clutching said actuator armature to said actuator armature shaft, actuator brake means for braking said actuator armature, an electric control circuit for selectively and individually energizing said motor fields and said electromagnetic control means, cam surfaces formed on said ring gear, a pair of extensions formed on said carrier member, a first pair of limit switches each operatively engaging a separate one of said cam surfaces, a second pair of limit switches each operatively energizing a separate one of said carrier member extensions, said limit switches forming a portion of said electric control circuit, said forward motor field being opened by one of said second pairs of limit switches when the motor torque reaction on said carrier exceeds a predetermined value as the motor armature turns in a forward direction, said reverse field being opened by one of said first pairs of limit switches upon a predetermined degree of rotation of said motor armature in the reverse direction.

14. The combination as set forth in claim 13 wherein said actuator clutch means includes an electric coil winding disposed in proximity to said actuator armature, a movable clutch element adapted to partially engage said actuator armature and said actuator armature shaft upon movement in one direction, said coil windings providing a magnetic field for urging said clutch element in said one direction, said coil windings being electrically connected to said motor field windings, said actuator clutch means being adapted to be energized simultaneously with said motor fields.

15. The combination as set forth in claim 14 wherein said actuator brake means includes a movable brake element adapted to normally brake said actuator armature shaft, said brake element being urged in said one direction by the magnetic field of said coil windings to release said actuator brake means while said actuator clutch means is energized.

16. In a multiple speed automatic transmission comprising a planetary gear unit and friction brake means for selectively braking portions of said gear unit, the combination of a camshaft, cam elements carried by said camshaft, said cam elements being in operative engagement with said friction brake means, an electric motor comprising an armature and forward and reverse motor fields, an actuator housing, an actuator armature shaft disposed within said housing, a planetary gear reduction unit interconnecting said actuator armature shaft and said camshaft, a first actuator armature drivably connected to said motor armature, a second actuator armature, one of said actuator armatures being slidably carried by the other, coil windings disposed in proximity to said actuator armatures, said coil windings being connected in the circuit for said motor fields, and first and second engageable clutch elements carried by said second actuator armatures and by said actuator armature shaft respectively, said clutch elements drivably connecting said actuator armature and said actuator armature shaft when said coil windings are energized.

17. In a multiple speed automatic transmission comprising a planetary gear unit and friction brake means for selectively braking portions of said gear unit, the combination of a camshaft, cam elements carried by said camshaft, said cam elements being in operative engagement with said friction brake means, an electric motor comprising an armature and forward and reverse motor fields, an actuator housing, an actuator armature shaft disposed within said housing, a planetary gear reduction unit interconnecting said actuator armature shaft and said camshaft, a first actuator armature drivably connected to said motor armature, second actuator armature, one of said actuator armatures being slidably carried by the other, coil windings disposed in proximity to said actuator armatures, said coil windings being connected in the circuit for said motor fields, first and second engageable clutch elements carried by said second actuator armatures and by said actuator armature shaft respectively, said clutch elements drivably connecting said actuator armature and said actuator armature shaft when said coil windings are energized, a brake element slidably carried by said actuator armature shaft and spring means acting on said brake element and said second clutch element in one axial direction, said spring means biasing said brake element into frictional engagement with said actuator housing, and said first clutch elements being moved in the other axial direction into engagement with said second clutch element when said coil winds are energized.

(References on following page)

References Cited in the file of this patent

UNITED STATES PATENTS

| | | | |
|---|---|---|---|
| 773,977 | Pearson | Nov. 1, | 1904 |
| 782,547 | Coffee | Feb. 14, | 1905 |
| 908,419 | Northway | Dec. 29, | 1908 |
| 936,284 | Abernethy | Oct. 12, | 1909 |
| 1,240,374 | Rowledge | Sept. 18, | 1917 |
| 1,256,372 | Rowledge | Feb. 12, | 1918 |
| 2,046,283 | Beryln | June 30, | 1936 |
| 2,157,267 | Madle | May 9, | 1939 |
| 2,292,633 | Griswold | Aug. 11, | 1942 |
| 2,354,854 | Doll | Aug. 1, | 1944 |
| 2,403,094 | Lear | July 2, | 1946 |
| 2,465,601 | Ochtman | Mar. 29, | 1949 |
| 2,490,044 | Garbarini | Dec. 6, | 1949 |
| 2,512,349 | Loveland | June 20, | 1950 |
| 2,546,378 | Winther | Mar. 27, | 1951 |

FOREIGN PATENTS

| | | | |
|---|---|---|---|
| 993,137 | France | July 18, | 1951 |